C. GREEN.
Cheese Skipper-Extractors.
No. 135,542. 
Patented Feb. 4, 1873.
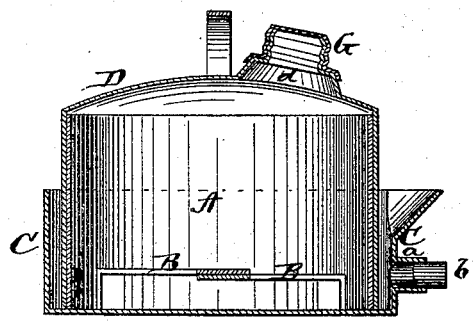
Witnesses:
Inventor.
Caleb Green
per Alexander Mason
Attorneys.

UNITED STATES PATENT OFFICE.

CALEB GREEN, OF OSSEO, MICHIGAN, ASSIGNOR TO HIMSELF, SETH D. McNEAL, AND ALFRED M. GREEN, OF SAME PLACE.

IMPROVEMENT IN CHEESE-SKIPPER EXTRACTORS.

Specification forming part of Letters Patent No. 135,542, dated February 4, 1873.

*To all whom it may concern:*

Be it known that I, CALEB GREEN, of Osseo, in the county of Hillsdale and in the State of Michigan, have invented certain new and useful Improvements in Device for Extracting Skippers from Cheese; and do hereby declare that the following is a full, clear, and exact description thereof, reference being had to the accompanying drawing and to the letters of reference marked thereon making a part of this specification.

The nature of my invention consists, first, in a process for extracting skippers from cheese; and, second, in the construction and arrangement of a device or apparatus for carrying out said process, as will be hereinafter more fully set forth.

In order to enable others skilled in the art to which my invention appertains to make and use the same, I will now proceed to describe my process and the construction and operation of the apparatus, referring to the annexed drawing, which is a longitudinal vertical section of my apparatus.

My process for extracting skippers from cheese is simply by excluding air from the cheese for a certain length of time—say about twenty-four hours, more or less—when the skippers will all leave the cheese and drop down dead. This may be accomplished by simply placing the cheese on a grating, or its equivalent, in an air-tight vessel, and leaving it there for the time mentioned. When the vessel is opened and the cheese removed the skippers will be found below the grating on the bottom of the vessel.

As a convenient apparatus for this purpose, I use the following: A represents a box of any suitable dimensions provided with an interior grating or support, B, raised above the bottom of the box. The bottom of the box A extends beyond the sides all around the same for a suitable distance, and is provided with an upward-projecting rim, C, forming a receptacle around the lower part of the box. In this rim is a vent, *a*, as shown, provided with plug *b*.

The box A is covered by a cap, D, which extends around the same down to the bottom, completely inclosing the box. In the top of this cap is a vent, *d*, closed by an air-tight screw-cap, G.

The cheese is placed in the box A on the grating or rests B, and water is poured in the outside rim C. Open the vent in the cover D and place the same over the box and close the vent again. The box is now rendered perfectly air-tight, so that no fresh air can get into the same. The vent *a* may be opened by removing the plug *b*, and allow the superfluous water to pass off, enough, however, remaining in the outside rim C to exclude air from the box. After twenty-four hours, more or less, open the vent *d*, remove the cover, and take out the cheese; pour out the balance of the water, and the skippers will all be found in the bottom of the box.

In place of water I may use rubber, putty, or any other suitable material or substance for excluding air from the box.

Having thus fully described my invention, what I claim as new, and desire to secure by Letters Patent, is—

1. The within-described process for extracting skippers from cheese by placing the cheese on a grating or other suitable support in a vessel and excluding the air from the same for a certain length of time, substantially as herein set forth.

2. The within-described apparatus, consisting of the box A, grating or rests B, outside rim C with vent *a*, and the cap D with vent *d*, and screw-cap G, and used with water or other suitable substance for excluding the air from the box, substantially in the manner and for the purposes herein set forth.

In testimony that I claim the foregoing I have hereunto set my hand this 6th day of July, 1872.

CALEB GREEN.

Witnesses:
A. N. MARR,
THOS. JONES.